United States Patent
Mack et al.

(10) Patent No.: US 8,561,102 B1
(45) Date of Patent: Oct. 15, 2013

(54) LOCATION SPECIFIC VIDEO CONTENT RETRIEVAL ENABLING REGIONAL BLACKOUTS TO BE MAINTAINED

(75) Inventors: Robert E. Mack, Collegeville, PA (US); Niranjan R. Samant, Lansdale, PA (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 13/587,069

(22) Filed: Aug. 16, 2012

(51) Int. Cl.
*H04N 7/16* (2011.01)

(52) U.S. Cl.
USPC ............. 725/25; 725/28; 725/109; 725/112

(58) Field of Classification Search
USPC .................................. 725/25, 28, 109, 112
See application file for complete search history.

(56) References Cited

U.S. PATENT DOCUMENTS

| 7,877,767 B2 * | 1/2011 | Jankins et al. ................ 725/25 |
| 2007/0226765 A1 * | 9/2007 | Bahnck et al. ................ 725/63 |
| 2011/0041147 A1 * | 2/2011 | Piepenbrink et al. ........... 725/28 |
| 2011/0055866 A1 * | 3/2011 | Piepenbrink et al. ........... 725/40 |
| 2011/0173650 A1 * | 7/2011 | Jankins et al. ................ 725/25 |
| 2012/0174150 A1 * | 7/2012 | Reddy et al. .................. 725/31 |
| 2013/0053057 A1 * | 2/2013 | Cansino et al. ............ 455/456.1 |

* cited by examiner

*Primary Examiner* — Mulugeta Mengesha
(74) *Attorney, Agent, or Firm* — Thomas A. Ward

(57) ABSTRACT

A video content delivery system is provided for set top boxes (STBs) that may be relocated as well as mobile clients using the Internet to retrieve content manifest files pertaining to the geographic area in which they are located. To provide this system, the edge cache in each geo-location region of a content provider is configured to append location specific metadata to a client's original HTTP request for content, making the request geo-location or region specific. The specific metadata appended by the edge cache in each region prevent clients from bypassing blackout or other content restrictions by moving from a non-restricted area and sending inaccurate location information. In another feature of the system to prevent client bypassing of blackout restrictions, the edge cache when communicating with the STB removes any location specific information which the client provides.

15 Claims, 3 Drawing Sheets

LOCATION SPECIFIC VIDEO CONTENT RETRIEVAL ENABLING REGIONAL BLACKOUTS TO BE MAINTAINED

BACKGROUND

1. Technical Field

The present invention relates to a system for identifying and delivering location specific video content available for portable Set Top Boxes (STB). More particularly, the present invention relates to a system for maintaining regional blackouts.

2. Related Art

Internet Protocol (IP) STBs are being offered as more portable devices that can be used both in the home and at other locations outside the home. The IP STBs can be disconnected from a television and moved from location to location, or portable devices such as tablet computers and smart phones can be programmed to function as IP STBs. With IP STB portability, it will be desirable for content providers to control the content delivered in different areas. For example, it is anticipated that blackout control will be a required function for portable IP STBs to prevent the devices from receiving content based on their actual location when the IP STB is moved.

Blackout can be provided for specific content in a channel or it can be provided for the entire channel. As an example of blackout of content, the NFL will at times black out transmission of a football game within a certain radius of a stadium that is not sold out to potentially increase in-person attendance. The NFL game, however, will not be blacked out far from the stadium. A set top box that is configured or tuned to a service area outside of the blackout area when transported into the blackout area, unless it is retuned, will continue to receive the NFL game coverage. A similar situation exists when an IP STB is transported from one cable service provider location that offers a particular channel to another location where the particular channel is not offered.

Currently, blackout is enforced through the content provider's uplink control system. Normally, a retune command is inserted at the uplink control system and targeted to individual IP STBs, also referred to as Integrated Receiver Decoders (IRDs) that are known to be operating within a specific region. When a specific IP STB observes a retune command addressed to it, it will perform a retune that will cause the video stream to be muted or replaced with an alternative service for the duration of the blackout. Similar functionality can be provided in multi-screen systems through manipulation of the adaptive streaming playlist or manifest files during a blackout event. However, a method is needed to guarantee that the IP STB receives the appropriate manifest/playlist file based on the device's actual physical location within the network and that attempts by illicit client's to manipulate requests to acquire manifests for content restricted within that area are blocked. Furthermore, the method should seamlessly handle a device dynamically changing its location, moving in and out of different access networks, without dependencies being placed on the client device itself.

SUMMARY

Embodiments of the present invention provide a system to guarantee that stationary and mobile clients can retrieve only content (e.g. manifest files) pertaining to the geographic area in which they are located. Embodiments of the present invention can further prevent a client from intentionally manipulating content requests to obtain content that is blacked out for the region.

To provide this system, the edge cache or other access network element of the Content Delivery Network (CDN) is configured to append location specific metadata to a client's original HTTP request for content, making the request geo-location region specific. In the system, a packager creates an original manifest file for the content provider to deliver video content to clients, and a playlist rebuilder extracts the original manifest file from the packager and generates regional manifests for each geo-specific service area region that is then provided to an origin server. The origin server receives the regional specific manifest files and directs the files to the appropriate edge cache for an area. The original manifest files for each region can be identical to all the regional manifest files until a blackout or other content restriction is imposed. The specific metadata appended to a client's HTTP request for a playlist or content file by the edge cache instead of individual clients in the area of the edge cache will prevent clients from bypassing blackout restrictions by moving from a non-restricted area and sending inaccurate location data.

To further prevent client manipulation of blacked out content, the edge cache when communicating with the client removes any location specific information in content URLs to obscure that information from the client. This will help prevent a client from inserting location specific information from a non-restricted area to bypass the blackout restrictions because the access network will expect non-location specific requests from clients and will reject any location specific requests or will overwrite them with the appropriate URL for requests entering the network from that access point The above techniques coupled with the notion of creating geo-location specific manifest/index files that are stored on the origin server of the CDN will allow for the enforcement of content provider blackout restrictions on both stationary and mobile clients.

BRIEF DESCRIPTION OF THE DRAWINGS

Further details of the present invention are explained with the help of the attached drawings in which.

DETAILED DESCRIPTION

In a centralized architecture where packaging and hence manifest creation is being performed, a new manifest or sequence of manifest files needs to be created during the blackout event for clients within the affected region. A simple approach that works for both stationary clients (e.g. IP STBs) and mobile clients is to create unique manifest files per Geographic Region Code (GRC). The new sequence of manifest files will direct those affected clients to tune to alternative content for the duration of the blackout event.

Figure 1:
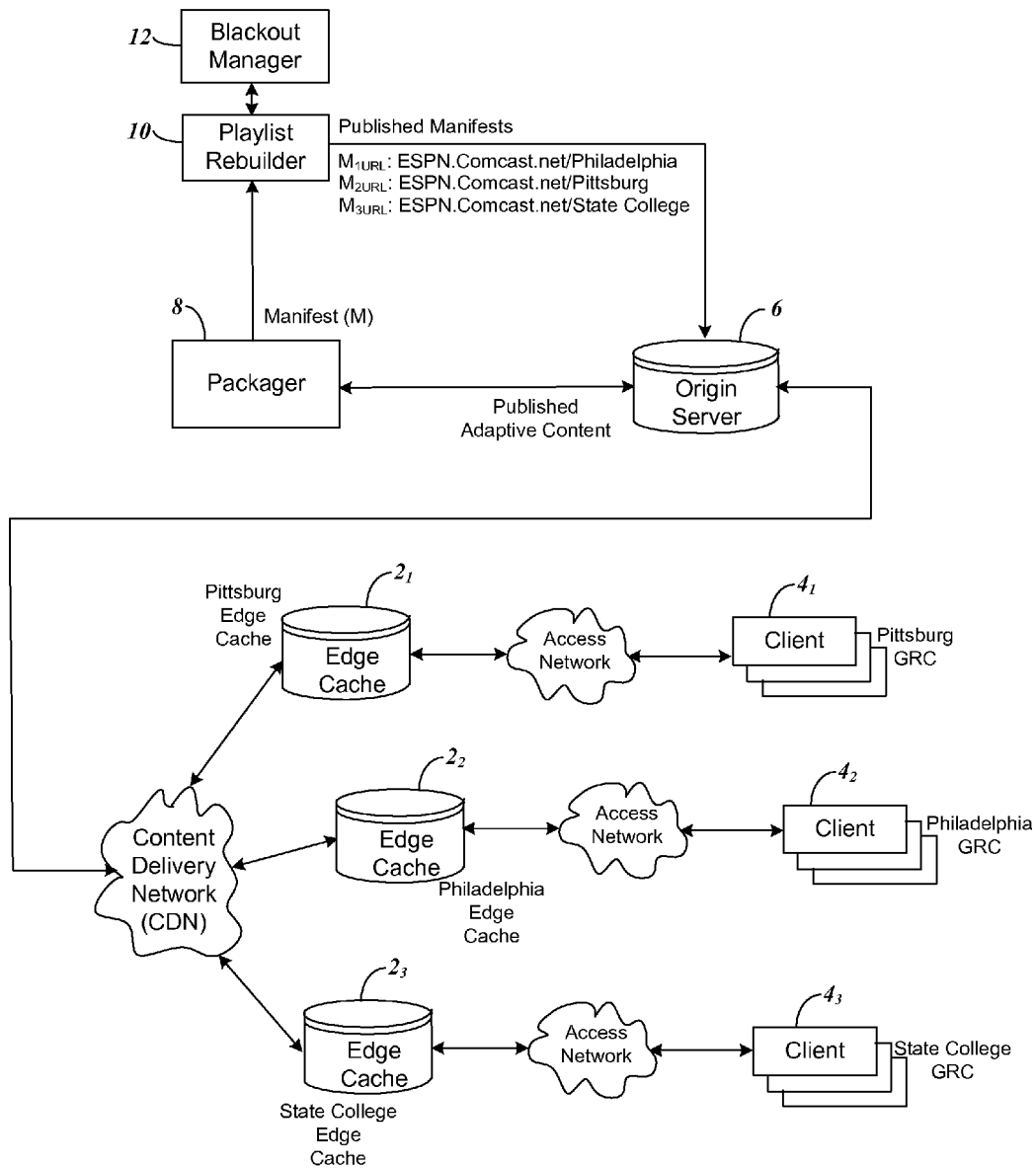
FIG. 1 is a block diagram of components for a system to enable regional blackout restrictions to be maintained.

FIG. 1 shows a block diagram of components for a system to enable creation of unique manifest files per geographic region as well as a system according to embodiments of the present invention to enable regional blackout restrictions to be maintained. The upper half of FIG. 1 includes components for creation and serving of the manifest files. As shown, the packager 8 initially generates one or more original manifest files (M) that identifies the location of the video content files the content provider desires to distribute to clients. The manifest file (M) is delivered from packager 8 to a playlist rebuilder 10.

The manifest file(s) (M) created by the packager 8 are extracted by the playlist rebuilder 10 and used to create unique regional manifest files per geographic region code. As illustrated in FIG. 1, a unique manifest is created for the Pittsburgh, Philadelphia, and State College GRCs. The manifest URLs $M_{1-3}$ for each specific region is, respectively: ESP-N.comcast.net/Pittsburgh, ESPN.comcast.net/Philadelphia, and ESPN.comcast.net/State College. The video content files identified within the different regional manifests can be identical until such time as a blackout event is required to be enforced. At that time, the playlist rebuilder 10 modifies the manifest file for that area by replacing the blacked out content URLs with URLs for the content to be substituted.

The playlist rebuilder 10 performs the function of generating the different regional manifests under control of a blackout manager 12. The blackout manager 12 will include components that provide knowledge of the CDN topology. More specifically the blackout manager 12 will have a mapping of each edge cache $2_1$-$2_3$ that delivers each separate regional manifest to the specific geographic region served by the edge caches $2_1$-$2_3$.

The published regional manifests $M_{1URL}$-$M_{3URL}$ from the playlist rebuilder 10 are then provided to the origin server 6. The origin server 6 delivers video content based on requests received from the edge caches $2_1$-$2_3$ through the content delivery network (CDN) as directed by the regional manifests $M_{1URL}$-$M_{3URL}$. The origin server 6 receives content from the packager 8 as well as regional manifests from the playlist rebuilder 10 to enable serving of the video content to the edge caches $2_1$-$2_3$. Although edge caches $2_1$-$2_3$ are shown, another network access element can likewise be used to distribute video content to clients within a specific GRC.

The edge caches $2_1$-$2_3$ provide video content to clients $4_1$-$4_3$ located in their respective area through access networks. The clients $4_1$-$4_3$ send requests for the content, and the edge caches $2_1$-$2_3$ forward the data if already stored or fetch the data from the origin server 6 if another client has not previously requested the same content. Today, in order to enforce geographic content restrictions across IP video distribution networks, management systems are being considered that would be capable of geo-locating client devices using network location services that map an IP address to a region or maintain a database of client IDs relative to locations. These management systems also require a client to behave appropriately by notifying the management system if it moves across geo-graphic boundaries so that the system can redirect the client to an alternate manifest. Thus, the clients need to be designed to behave properly and to report dynamic location changes continuously. These are significant limitations that require investment in intelligent management systems and clients that adopt a consistent behavior.

Embodiments of the present invention provide a system to cause a particular client within a given GRC to retrieve the right manifest for that area. The system accomplishes this by having edge distribution network (or edge cache $2_1$-$2_3$), when communicating through the upstream CDN, to append location specific metadata into the client's original HTTP request for the manifest file. For example, if Comcast is the subscriber's service provider, and if the subscriber or client is trying to acquire ESPN, the guide/navigation function would provide the ESPN URL or part of the URL as, espn.comcast.net/index. This location specific metadata will be inserted within the access network at the boundary (edge cache) between the access network and CDN ingress point, so as to accurately identify the physical location of the client upstream to the component that will source the content. This would result in a modified URL, espn.comcast.net/pitt/index being sent through the CDN to origin server 6 as part of the HTTP request.

The origin server 6 will simply fetch the appropriate manifest/content file identified and previously placed on the origin server 6 during the manifest creation process. The origin server 6 will forward the selected file(s) to the appropriate one of the edge caches $2_1$-$2_3$ requesting the content/manifest on behalf of the client. If the edge cache was already serving another client with the same "live" content it will forward the appropriate content/manifest simultaneously to the old and new requesting clients without having to go back upstream.

The system according to the present invention has an added benefit in that it will prevent a client from accidentally inserting the wrong location information that might cause the wrong content to be fetched for a given region. The client cannot intentionally request content for the wrong region because the region specific information in the URL is inserted by a server at the edge caches $2_1$-$2_3$, and not by a client who could potentially have the wrong region information.

To further prevent any client's intentional manipulation of blacked out content, the edge cache when communicating with a client removes any location specific information in content URLs which the client provides. This will prevent a client from inserting location specific information from a non-restricted area to bypass the blackout restrictions.

As a further step to prevent any client interference with location specific URL information, embodiments of the present invention take steps to remove the location specific information from the URL (in the manifest file) sent back to the client with the client requested content. To accomplish this, the edge cache server is used to remove any region specific information from the client manifest before transmission of a region specific manifest to the client. Thus to a client the manifest for a given service looks the same, irrespective of the region where it is located.

Figure 2:
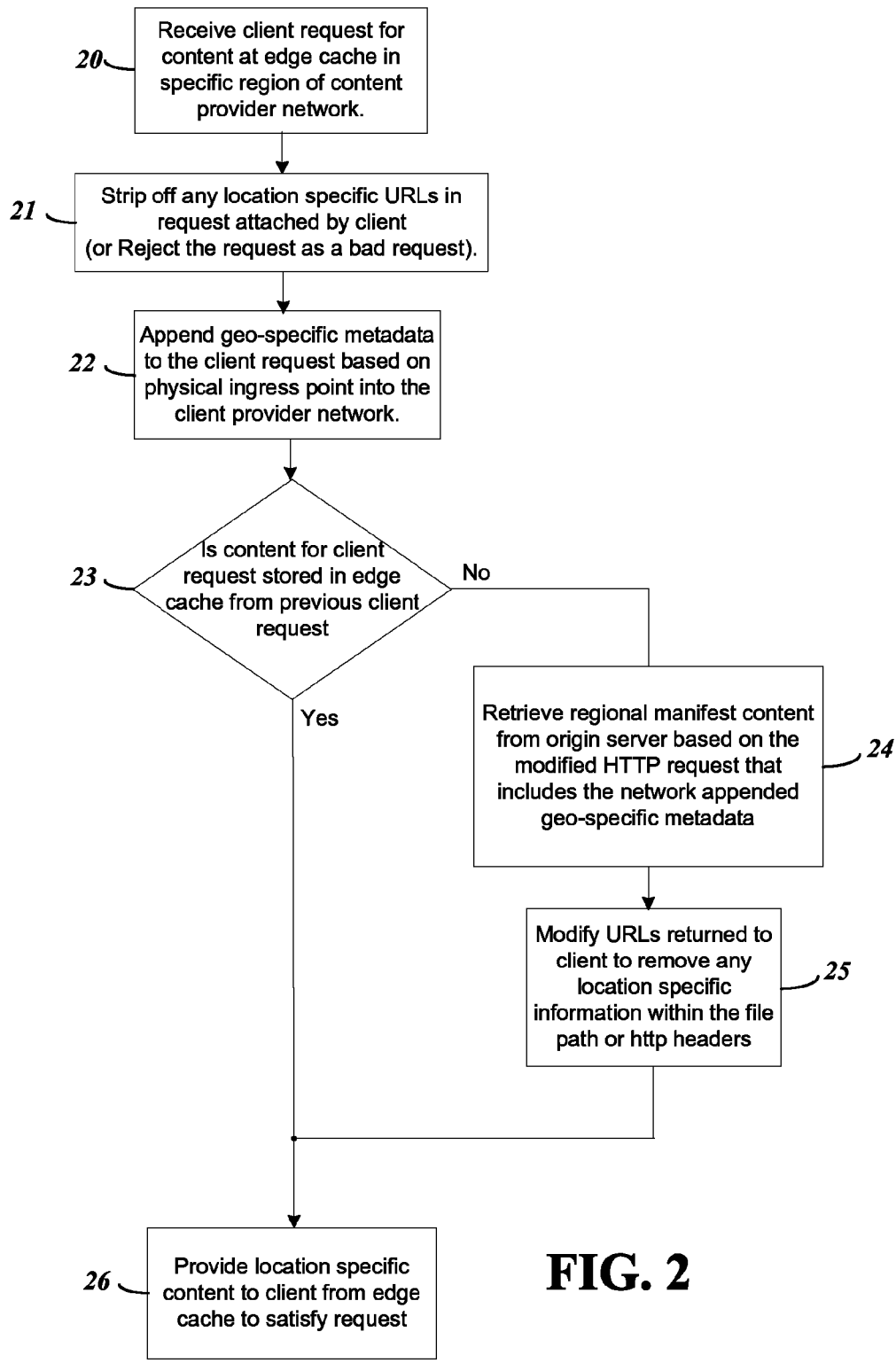
FIG. 2 is a flow chart illustrating the procedure for attaching metadata to maintain blackout restrictions.

FIG. 2 is a flow chart providing a review of the procedure according to the present invention to accomplish maintaining blackout restrictions. In step 20, the edge cache in a specific region receives a request for content from a client provided within an access network supported by the edge cache. In step 21, the edge cache strips off any location specific information from URLs being requested within the client's HTTP request to prevent client manipulation of the data to bypass blackout restrictions. Alternatively in step 21, the request can simply be rejected as a bad request. Next in step 22, the edge cache appends geo-specific metadata to the client request based on the physical ingress point of the request into the client provider network. Next, in step 23, the edge cache determines if the content requested by the client has previously been requested by another client and stored in the edge cache. If not, the requested content is obtained by the edge cache from the origin server based on the modified HTTP request that includes the network appended geo-specific metadata in step 24. Further in step 25 any URLs that are returned to the client are modified to remove any location information within the file path or http headers and the process proceeds to step 26. If the content was previously stored in the edge cache as determined in step 23 the process proceeds from step 23 to step 26. In step 26, the location specific content is provided from the edge cache to the client to satisfy the request. Although not shown, in some embodiments the edge cache further strips off any geo-location specific data before providing the requested content to the client in step 29.

Figure 3:
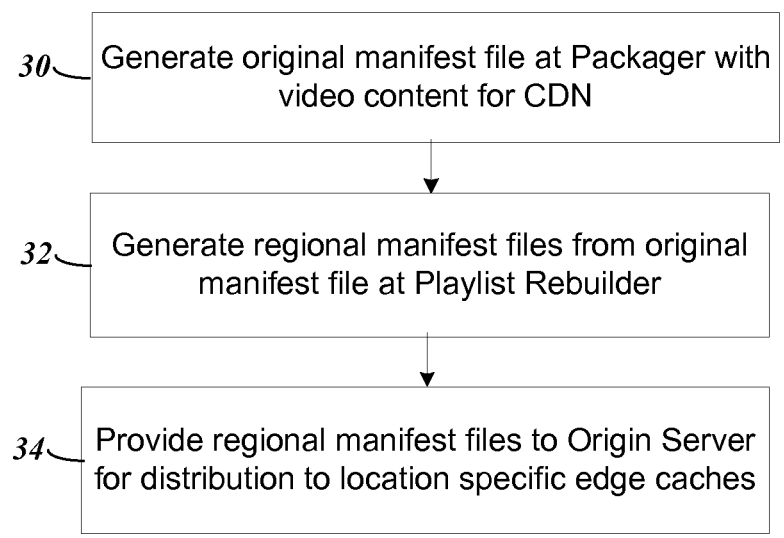
FIG. 3 is a flow chart illustrating creation of region specific manifest files.

FIG. 3 is a flow chart providing a review of the procedure according to the present invention to accomplish creation of region specific manifest files. In step 30, the packager generates the original manifest file with the video content desired by a content provider for a CDN. In step 32, the playlist rebuilder obtains the original manifest file from the packager and generates regional manifest files as controlled by the blackout manager. Finally, in step 34, the regional manifest files are delivered to the origin server with the geo-location specific URLs to enable distribution of content to edge caches in specific locations.

Embodiments of the present invention as described above, thus provide a simple and reliable method that works if mobile clients cross GRCs dynamically. As the client moves in and out of different access points, the network elements at the edges of the network add location specific metadata that becomes part of the request, resulting in the return of the appropriate manifest. The method is robust and simple and handles dynamically changing GRCs without client communication to upstream managers, so it works well with mobile clients. This method guarantees enforcement of "Content Blackout" rules and restrictions on stationary and mobile MSV (Multi Screen Video) clients receiving ABR (Adaptive Bit Rate) content associated with the affected area.

Embodiments of the present invention as described above further prevent clients from deciphering region specific manifest files and then manipulating them to request blacked out content. This method does not require session management for stationary or mobile clients for implementation of content blackout. This method further does not require geo location resolution of individual stationary or mobile clients. The implementation ensures delivery of appropriate content to the appropriate region.

Although the present invention has been described above with particularity, this was merely to teach one of ordinary skill in the art how to make and use the invention. For example, although the figures show use of a cable service provider system to deliver content through edge caches, the content can be delivered over the Internet to mobile devices. With an Internet based system, the edge caches would be replaced by local IP servers that can append a geo-location specific URL code to content requests provided from a mobile device, rather relying on the mobile device to provide its location to ensure region specific data is provided to the mobile device. Many additional modifications will fall within the scope of the invention, as that scope is defined by the following claims.

What is claimed:

1. A method for providing location control when delivering video content, the method comprising:

obtaining an original manifest file and generating a regional manifest file to provide content for each of a plurality of geo-location service area regions based on the original manifest file;

receiving a request for the content from a client device at a given network access element in a plurality of network access elements, each network access element being located in a different one of the geo-location service areas;

removing any geo-location specific information in content URLs received from the client device in the request to prevent the client device from manipulating the content URLs to bypass blackout restrictions that apply to the geo-location area;

appending metadata specific to the geo-location service area of the respective network access element to the request using the given network access element; and providing the requested content with the blackout restrictions that apply to the geo-location area of the given network access element.

2. The method of claim 1, wherein the network access elements comprise at least one of: an edge cache, a streaming server, an Internet Protocol (IP) network element, a cable modem termination system (CMTS), and a digital subscriber line access multiplexer (DSLAM).

3. The method of claim 1, wherein a content provider creates the geo-location specific manifest files that are stored on an origin server, and wherein the origin server provides the geo-location specific manifest files to individual ones of the network access elements, wherein one of the manifest files are served to the client device in response to the request.

4. The method of claim 1 wherein the client devices comprise at least one of: an internet protocol (IP) set top box (STB), a STB and a mobile device.

5. The method of claim 1, wherein the client device's request is an http request.

6. The method of claim 1, wherein the restrictions comprise blackout restrictions or targeted content release to a specific region.

7. The method of claim 1, wherein the request for content comprises a request for a playlist or a request for a content file.

8. A network system providing location control of deliverable video content comprising:

network access elements, each network access element linked to a origin server to receive a regional manifest files to deliver video content to a given geo-specific region where it is located, each network access element further connected to receive requests for content from client devices within the given geo-specific region, wherein the network access elements remove any geo-location specific information in content URLs received from the client devices in the requests for content to prevent the client devices from manipulating the content URLs to bypass blackout restrictions that apply to the geo-location regions;

wherein the network access elements append metadata to the requests for content received from the client devices in the respective geo-location region where they are located, the metadata identifying the respective geo-location region; and wherein the network access elements provide the requested content to the client devices with the blackout restrictions that apply to the respective geo-location regions.

9. The network system of claim 8, wherein the network access elements comprise at least one of: an edge cache, a streaming server, an Internet Protocol (IP) network element, a cable modem termination system (CMTS), and a digital subscriber line access multiplexer (DSLAM).

10. The network system of claim 8, wherein the restrictions comprise blackout restrictions or targeted content release to a specific region.

11. A network system providing location control of deliverable video content comprising:

a packager for creating an original manifest file;

a playlist rebuilder for extracting the original manifest file from the packager and generating a regional manifest file for each of a plurality of geo-specific service area regions;

an origin server for fetching the regional manifest files;

edge caches, each edge cache linked to the origin server to receive the regional manifest files for a given one of the geo-specific regions where it is located, each edge cache further connected to receive http requests for content from client devices within their given geo-specific region, wherein the edge caches further remove any geo-location specific information in content URLs received from the client devices in requests for content to prevent the client devices from manipulating the content URLs to bypass the blackout restrictions, wherein each edge cache appends metadata specific to the respective given geo-location region to an http content request received from client devices in the respective given geo-location region; and wherein each edge cache provides the content requested with the blackout restrictions that apply to the respective given geo-location region.

12. The network system of claim 11, wherein the edge caches pass the http requests for geo-specific content to the origin server when the content requests have not previously been requested and stored.

13. The network system of claim 11, further comprising a blackout manager for controlling the playlist rebuilder to enable generation of the regional manifest files with desired content blacked out.

14. The apparatus of claim 11, wherein the playlist rebuilder modifies the regional manifest file when service is to be blacked out by replacing one or more of the content URLs to be blacked out with URLs for the content to be substituted.

15. The apparatus of claim 11, wherein each of the regional manifest files are identical to the original manifest file until the playlist rebuilder modifies one of the regional manifest files to black out service.

* * * * *